Oct. 18, 1949.  H. T. LORENZ  2,484,953

THREAD INSPECTING OR GAUGING APPARATUS

Filed March 12, 1945

Inventor
Henry T. Lorenz
by Arthur M. Nelson
Atty

Patented Oct. 18, 1949

2,484,953

UNITED STATES PATENT OFFICE 2,484,953

THREAD INSPECTING OR GAUGING APPARATUS

Henry T. Lorenz, Chicago, Ill., assignor, by mesne assignments, to Harry J. Graw, Chicago, Ill.

Application March 12, 1945, Serial No. 582,328

3 Claims. (Cl. 33—199)

This invention relates to improvements in thread inspecting or gauging apparatus and it consists of the matters hereinafter described and more particularly pointed out in the appended claims.

One of the objects of the present invention is to provide a simple efficient apparatus for accurately and rapidly gauging the effective length as well as diameters of threads and which not only reduces thread inspection monotony but materially increases the number of threaded pieces which may be inspected or gauged in a given period of time.

Another object of the invention is to provide apparatus of this kind which includes parts that insure the same application of imposed endwise pressure and torque for each threaded work piece to be gauged and which parts may be adjusted to control the imposed pressure for different sizes of such pieces.

A further object of the invention is to provide simple means which may be employed in connection with a horizontal type of tapping machine for converting the same into an apparatus for fast and accurate thread inspecting or gauging purposes.

Again, it is an object of the invention to provide apparatus of this kind that is capable of employing standard right or left hand thread gauges, either of the plug or ring type.

Again, it is an object of the invention to provide apparatus of this kind which is capable of gauging or checking relatively long or short threads whether internal or external ones and in which the gauges employed may be quickly changed from one type to the other.

The above mentioned objects of the invention, as well as others, along with the advantages thereof will more fully appear as the specification proceeds.

Figure 1:
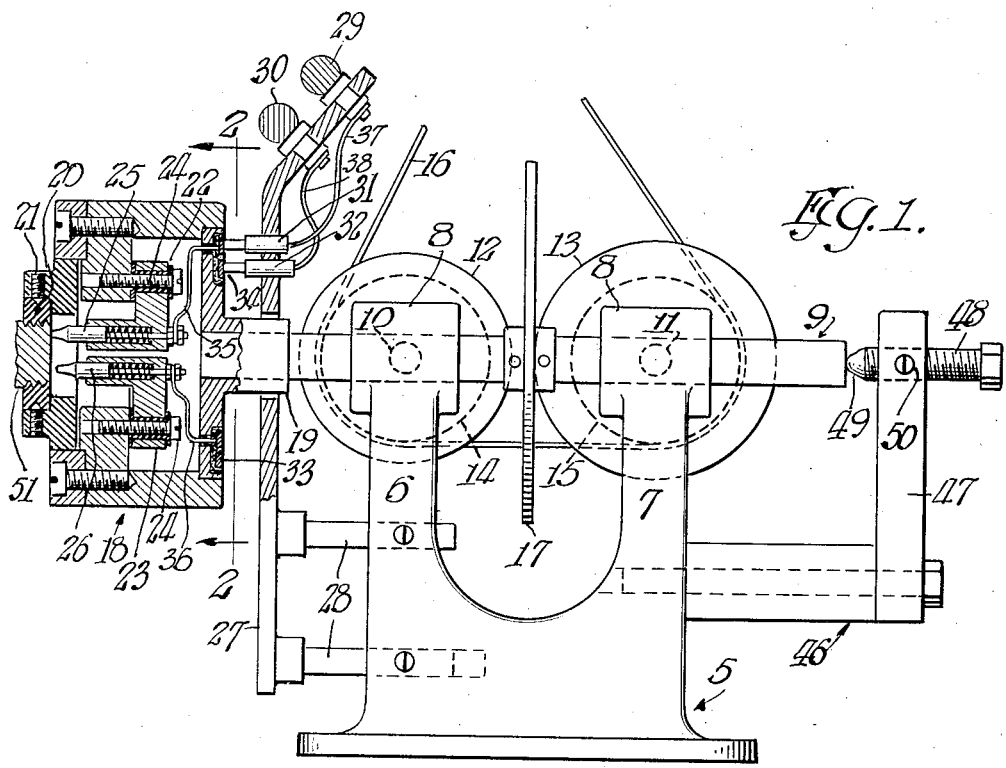
Fig. 1 is a view in side elevation of an apparatus embodying the preferred form of the invention for inspecting or gauging work pieces having external threads with some parts shown in longitudinal section better to illustrate the same.

In carrying out the invention I may make use of a well known horizontal type of tapping machine that includes a shaft mounted for rotation in either direction as well as for a limited endwise motion, and parts so arranged that when the shaft is moved endwise in one direction, it is rotated in one direction and when moved endwise in the other direction it is rotated in the other direction. Such a machine is known as a Rickert-Shafer tapping machine and one embodiment thereof is illustrated and described in the Johnson Patent 1,153,310 of Sept. 14, 1915.

In the use of such a machine, I apply a head to one end of the shaft thereof and which head is adapted to receive and hold a standard ring thread gauge or a standard plug thread gauge in such a position as to have the threaded end of a work piece presented thereto for gauging.

When the work piece is inserted into the gauge the endwise pressure shifts the shaft endwise so that it is rotated in one direction and this causes the work piece to be screwed into the die of the gauge. It is desired for accuracy and uniformity that the pressure imposed upon the gauge with the insertion of each work piece be the same for each work piece and therefore I provide an adjustable stop or torque control for the shaft. The head includes feelers, one of which is associated with a "go" indicating means, and the other of which is a "no go" indicating means, and these feelers are so disposed that if the piece being gauged "goes" or checks for length, the "go" indicator is energized and the piece is passed for use. If the thread length is beyond the effective length, the other one of said feelers is engaged, and energizes the "no go" indicating means and the piece which cannot be passed for use is rejected or discarded. If the thread length is too short, neither feeler is engaged and neither indicator is energized, and the piece is rejected.

To remove the piece from the gauge, a slight pull is exerted on the piece and this shifts the shaft endwise in the other direction, to be driven in reverse, so that the piece is unscrewed from the die and the apparatus is ready for the next piece to be gauged.

Referring now in detail to that embodiment of the invention illustrated in the drawings, 5 indicates as a whole the frame of a horizontal type of Rickert-Shafer tapping machine which includes two upright, longitudinally spaced standards 6 and 7 respectively, which are hereinafter referred to as "front" and "rear" standards respectively for ease in distinguishing between them. Said standards include axially aligned bosses 8—8 in which a shaft 9 is journaled for rotation, in both directions and is capable of a limited to and fro endwise movement.

Extending laterally from the same side of each boss is a stub shaft 10 and 11 respectively and journalled on said stub shafts are pulleys 12 and 13 respectively, which are substantially the same diameter. Preferably the peripheries of said pulleys have flat friction faces and adjacent portions of said faces are spaced only a slight distance apart. Each pulley 12 and 13 has a power transmitting pulley 14 and 15 respectively secured thereto and a belt 16, driven from a suitable source of power, is trained about said transmitting pulleys to drive the pulleys 12 and 13 in the same direction. With the pulleys 12 and 13 driven in the same direction, the adjacent peripheral portions thereof move in opposite directions.

A disc 17 is fixed to a mid portion of the shaft 9 between the bosses 8—8 and this disc is of such diameter as to have a marginal portion extending through the space between the adjacent peripheral portions of the pulleys 12 and 13 respectively. When the shaft 9 is moved endwise in one direction, this engages one side of the disc with the pulley 13 which drives the disc in one direction. When the shaft 9 is moved endwise in the other direction, this engages the other side of the disc with the pulley 12 which then drives the disc in the other direction.

A gauge receiving head 18 is fixed to that end of the shaft 9 that extends forwardly from the front boss 8 of the frame 5 by means of a rear end boss 19. In the front end of said head is a recess to receive standard ring type of thread gauge 20 which is removably secured in place in the head by set screws 21.

The recess before mentioned opens into the interior of the head wherein there is located block-like pieces 22 and 23 respectively, which are secured in place in the head by screws 24—24 which are suitably insulated from the associated pieces as by the insulating bushings as in Fig. 1. Each piece 22—23 is provided with a forwardly extending sleeve and journalled in each sleeve is a yielding spring-pressed feeler 25 and 26 respectively. The front ends of said feelers are made as work piece engageable stems, one of which extends into a position nearer the gauge 20 than the other. With the structure described the feelers 25—26 are insulated from the head 18.

27 indicates an upright face plate that is disposed between the head 18 and the front pulley 12. This face plate is supported in position by means of horizontal rods or bars 28—28 that extend forwardly from the front standard 6 of the frame. The upper portion of the face plate extends rearwardly as best appears in Fig. 1 and carries "go" and "no go" indicating means 29 and 30 respectively, preferably in the form of a "green" light and a "red" light respectively. This places the indicating means within full vision of the operator. Projecting forwardly from the face plate above the shaft 9 is a pair of electrical contact brushes 31 and 32 respectively, in circuit with an associated indicating means. These brushes are so arranged as to have a wiping engagement with associated current distribution rings 33 and 34 mounted in the rear face of but insulated from the head 18. Each ring is electrically connected to an associated feeler 25 and 26 respectively.

Figures 2, 3:
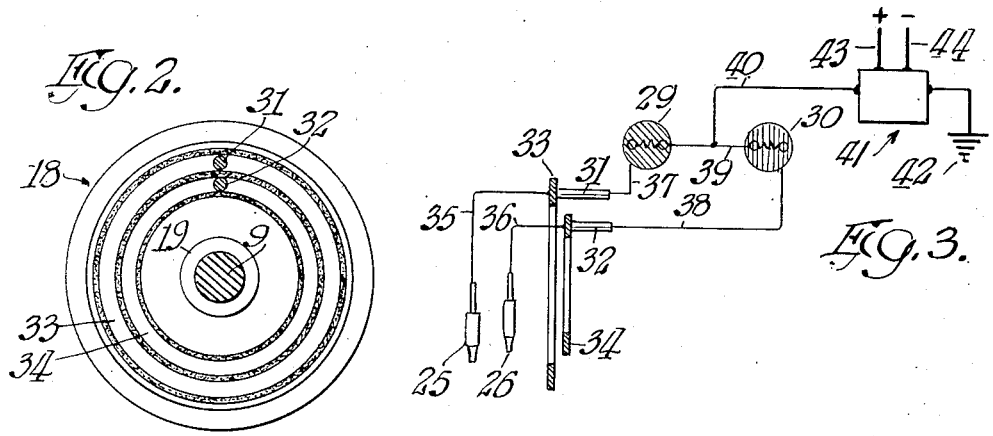
Fig. 2 is a vertical sectional view through a part of the apparatus shown in Fig. 1, as taken on the line 2—2 thereof.
Fig. 3 is a diagrammatic view of one form of circuit for the apparatus, to visually indicate to the operator, whether the threaded work piece being inspected or gauged is within the limits intended therefor.

In Fig. 3 is illustrated in diagram, the circuit between the feelers 25—26 and the "go" and "no go" indicating means 29 and 30 respectively, before mentioned. As indicated in the diagram each feeler, which is insulated from the head 18 as before mentioned, is connected by a conductor 35—36 to an associated ring 33 and 34 and each brush 31—32 is connected by a conductor 37 and 38 to one of the terminals of the associated "go" and "no go" indicating means or lights. The other terminal of both of said means is connected by a conductor 39, which in turn is connected by a conductor 40 to one side of a transformer 41 say of a capacity of 6 to 8 volts. The other side of said transformer is grounded as at 42 and which is preferably the frame 5. Conductors 43 and 44 lead into the transformer from a suitable source of current supply.

When the threaded end of a work piece, indicated at 51 in Fig. 1, is presented to the gauge 20 in the head 18, an endwise pressure is imposed thereon to shift the shaft 9 rearwardly so that the disc 17 engages and is driven by the pulley 13 so that the gauge is screwed upon the work piece. If the thread is of the effective length, the end of the work piece will engage the feeler 25 and close the circuit to the "go" indicating means which indicates that the work piece is acceptable for its purpose.

If the threaded part of the work piece is longer than the effective length desired, the gauge screws further onto the work so that the end of the work piece will engage the other feeler to energize the means which indicates that it is a "no go" or defective work piece and should be rejected.

If the threaded part is shorter than the effective length desired, it will engage neither feeler 25—26 so that neither indicating means is energized, which indicates that the piece is defective and should be rejected.

It is pointed out that in the course of a days work the operator in inspecting and gauging threaded work pieces, presents and withdraws many pieces to the gauge 20 and such work becomes not only monotonous but tiresome so that the pressure with which said pieces are presented, varies. It is desired that the same pressure be employed in presenting the pieces to the gauge and in fact some specifications require the pressures that should be used for better uniformity.

To control this limit of pressure, I provide on the "rear" standard a bracket 46 that includes an upright arm 47 arranged in the plane of and spaced from the rear end of the shaft 9 and extending to a point above the same. In this upright arm and coaxially with the shaft 9, I provide a threaded element 48 having a suitable end 49 that may be engaged by the end of the shaft 9 in its rearward endwise movement so as to limit said movement to an amount that corresponds to the pressure required to move the same endwise. With such a stop, the same amount of endwise pressure is imposed upon each work piece presented to the gauge. The member 48 may be locked in the adjusted position by a set screw 50 carried by the upright arm.

Figure 4:
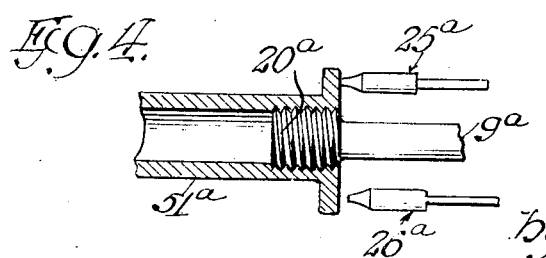
Fig. 4 is a fragmentary, sectional view illustrating diagrammatically the use of apparatus embodying the invention for testing or gauging work pieces having internal threads.

In Fig. 4 I have illustrated diagrammatically a modified form of the invention, wherein a plug gauge is employed for gauging the effective length of an internal thread in a work piece. In said figure the shaft is indicated at 9a and at its front end carries a plug gauge 20a to gauge the effective length of the internal thread of a piece of work 51a. In said figure I have illustrated the feelers 25a and 26a as disposed upon opposite sides of and closely adjacent the shaft. When the work piece which is held in the hand as before, is presented to the plug gauge, said gauge will screw into the internal thread.

If the thread is of the specified effective length, the end of the work piece will engage and actuate the feeler 25a to energize the "go" indicating means. If the internal thread is short in length, this feeler is not engaged so that there is no actuation of the indicating means. Should the internal thread be too long, the end of the work piece will first engage the feeler 25a and then the feeler 26a to energize the "no go" indicating means so that the piece may be rejected.

The apparatus is of simple construction and efficient in operation and is simple and easy to operate so as to increase the speed in gauging or inspection. Also the apparatus controls the pressure imposed upon the die used and this prevents a forcing of the die and therefore increases its useful period of service.

While in describing the invention, I have referred in detail to the form arrangement and construction of the parts employed, the same is to be considered only in the illustrative sense so that I do not wish to be limited thereto except as may be specifically set forth in the appended claims.

I claim as my invention:

1. Apparatus for gauging the effective length of thread on a work piece and embodying therein a shaft, stationary means in which said shaft is mounted for rotation, as well as for a limited endwise movement in either direction, means for rotatively driving said shaft in one direction or the other when moved endwise in one direction or the other and comprising a pair of spaced driving members and a driven member mounted on the shaft and adapted to engage alternatively the driving members, a head operatively secured to said shaft and adapted to carry a thread gauge, "go" indicating means and "no go" indicating means for said work piece, "go" and "no go" feelers carried by said head and associated with said "go" and "no go" indicating means respectively and adapted for engagement by the work piece being gauged for effective length of thread when operatively presented to the thread gauge, and adjustable means providing a torque control for said shaft to limit the axial pressure imposed upon said driven member by one of the driving wheels in presenting said work piece to said gauge.

2. Apparatus for gauging the effective length of thread on a work piece and embodying therein a shaft, stationary means in which said shaft is mounted for rotation as well as for a limited endwise movement in either direction, means for rotatively driving said shaft in one direction or the other when moved endwise in one direction or the other and comprising a pair of spaced driving members and a driven member mounted on the shaft and adapted to engage alternatively the driving members, a head operatively secured to one end of said shaft and adapted to carry a thread gauge, "go" indicating means and "no go" indicating means for said work piece, "go" and "no go" feelers carried by said head and associated with said "go" and "no go" indicating means respectively and adapted for engagement by the work piece being gauged for effective length of thread when operatively presented to the thread gauge, and means carried by said stationary means axially in line with the other end of the shaft and adjustable toward and away therefrom to provide a torque control for said shaft to limit the axial pressure imposed upon said driven member by one driving member in presenting said work piece to said gauge.

3. Apparatus for gauging the effective length of thread on a work piece and embodying therein a shaft, stationary means in which said shaft is mounted for a rotation, as well as for a limited endwise movement in either direction, means for rotatively driving said shaft in one direction or the other when moved endwise in one direction or the other and comprising a pair of spaced driving members and a driven member mounted on the shaft and adapted to engage alternatively the driving members, a head operatively secured to said shaft and adapted to carry a thread gauge, "go" indicating means and "no go" indicating means for said work piece, "go" and "no go" feelers carried by said head and associated with said "go" and "no go" indicating means respectively and adapted for engagement by the work piece being gauged for effective length of thread when operatively presented to the thread gauge, a circuit for said indicating means and including distributing rings carried by said head, one for each feeler and electrically connected thereto and brushes carried by said stationary means and each engaged with an associated ring for closing said circuit to either of said indicating means when the associated feeler has been engaged by the work piece being gauged, and means carried by said stationary means axially in line with the other end of the shaft to provide a torque control for said shaft to limit the axial pressure imposed upon said driven member by one driving member in presenting said work piece to said gauge.

HENRY T. LORENZ.

REFERENCES CITED

The following references are of record in the file of this patent:

UNITED STATES PATENTS

| Number | Name | Date |
| --- | --- | --- |
| 1,880,405 | Broecker | Oct. 4, 1932 |
| 1,940,783 | Adams | Dec. 26, 1933 |